US 6,711,386 B1

(12) United States Patent
Engblom (10) Patent No.: US 6,711,386 B1
(45) Date of Patent: Mar. 23, 2004

(54) METHOD FOR MOUNTING AN APPARATUS, AN APPARATUS AND AN APPARATUS PART

(75) Inventor: Göran Engblom, Kristianstad (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/504,948

(22) Filed: Feb. 16, 2000

(30) Foreign Application Priority Data

Feb. 17, 1999  (SE) ............................................... 9900584

(51) Int. Cl.[7] .............................. H04B 1/38; H04M 1/00
(52) U.S. Cl. ................. 455/90.3; 455/575.1; 455/550.1
(58) Field of Search ........................... 455/90.1, 550.1, 455/575.1, 566, 90.2, 90.3; 379/370, 428.01, 428.03, 429, 433.01, 433.04, 440; 438/67; 439/64, 91, 374, 752.5; 361/814

(56) References Cited

U.S. PATENT DOCUMENTS

| | | | |
|---|---|---|---|
| 4,582,309 A | | 4/1986 | Moxon et al. |
| 4,651,203 A | | 3/1987 | Peterson |
| 5,324,381 A | * | 6/1994 | Nishiguchi .................. 156/297 |
| 5,541,834 A | | 7/1996 | Tomigashi et al. |
| 5,867,772 A | * | 2/1999 | Jonsson et al. ............... 455/90 |
| 6,101,372 A | * | 8/2000 | Kubo .......................... 455/90 |
| 6,233,469 B1 | * | 5/2001 | Watanabe ................... 455/575 |
| 6,336,037 B1 | * | 1/2002 | Sekine et al. ............... 455/550 |
| 6,347,218 B1 | * | 2/2002 | Fuhrmann et al. ............ 455/90 |

FOREIGN PATENT DOCUMENTS

| | | |
|---|---|---|
| EP | 0 569 011 A1 | 11/1993 |
| EP | 0 808 092 A2 | 11/1997 |
| FR | 2 741 505 | 5/1997 |

OTHER PUBLICATIONS

International–Type Search Report dated Oct. 26, 1999.

* cited by examiner

Primary Examiner—Erika Gary
(74) Attorney, Agent, or Firm—Burns, Doane, Swecker & Mathis, L.L.P.

(57) ABSTRACT

The invention relates to the assembly of devices, produced by replication on a substrate (e.g. LCDs on a glass plate) and separated from each other by a cutting process. Because of the unevenness of the cutting, an assembly of the devices based on the outer boundary of the substrate has inherent inaccuracies. In particular, the invention relates to the precision mounting of a first apparatus part ((1) e.g. an LCD unit) on a second apparatus part ((2) e.g. a light guide) in an apparatus ((3) e.g. a mobile telephone). The invention utilises distinctive marks (6) precisely laid out on the first apparatus part (1) during its processing to control the positioning of decisive components (5) on the apparatus part (1) relative to corresponding features (11) on another apparatus part (2). This is achieved (e.g. using a vision system) by securing positioning means (7) on the first apparatus part (1) and joining them to corresponding co-operating positioning means (4) on the second apparatus part (2), both being designed and positioned using the information of the position of the distinctive marks (6) relative to the decisive components (5) on the first apparatus part (1).

19 Claims, 7 Drawing Sheets

METHOD FOR MOUNTING AN APPARATUS, AN APPARATUS AND AN APPARATUS PART

This application claims priority under 35 U.S.C. §§119 and/or 365 to 9900584-5 filed in Sweden on Feb. 17, 1999; the entire content of which is hereby incorporated by reference.

The invention relates to a method for the precision mounting of a first apparatus part on a second apparatus part, the first apparatus part having irregular edges, and the second apparatus part being provided with first positioning means, and the first apparatus part including one or more components positioned on the apparatus part by means of a position reference system.

The invention further relates to an apparatus including at least a first apparatus part and a second apparatus part which are mutually precision-mounted by means of first positioning means on the second apparatus part and second positioning means on the first apparatus part so that components on the first apparatus part are positioned with a well-defined geometrical relationship relatively to structural features on a second apparatus part.

The invention further relates to an apparatus part including one or more components positioned on the apparatus part by means of a position reference system.

The present invention relates to the assembly of planar devices in particular. In mass production of some planar electronic parts, identical devices are replicated on the same substrate (e.g. integrated circuits or micro-mechanical parts (or combinations thereof) on a wafer or electronic displays on a glass plate, etc.) and separated from each other by some sort of cutting process, e.g. a sawing process using a diamond saw. The cutting is performed in predefined scribe lanes whose width and degree of evenness after the cutting are dependent on the particular devices, process, substrate materials and cutting tools in question. Because of this unevenness, it is, however, a common problem to give accurate information on the distance from the outer boundary of the substrate to particular devices or structures on the substrate interior. Hence, the mounting of such cut-out parts based on the outer, uneven, boundary of the part has an inherent inaccuracy originating from the cutting process. This causes problems, when the alignment of a cut-out part in a mounting process relative to another structure has to be made precisely according to the absolute position of a specific component or structural element on the substrate, e.g. the active area of a liquid crystal display or the optical lens of a micro-mechanical, optical device, etc.

The following account of prior art relates to the mounting of a display unit in a mobile telephone.

Display units, in particular liquid crystal displays (LCD) are today placed in a mobile phone by using a carrier or light guide that is mounted on the printed circuit board (PCB). The LCD is positioned on the carrier/light guide, and the carrier and the PCB are mounted on the frame or housing of the phone. The LCD needs to be very accurately positioned on the light guide, so that the display unit is correctly positioned inside the window of the front cover of the frame. Also, the LCD must be extremely accurately positioned with respect to the PCB in order to ensure a safe and reliable electrical contact between the elastomeric connector on the display unit and the corresponding contact portions on the PCB.

The generally flat LCD substrate is positioned on the carrier by means of its outer edges using a frame-like fixture that is mounted on the light guide. The LCD is held between two spring levers on two opposing side edges of the LCD. Thereby, the LCD is claimed and centered in the fixture. The fixture is then mounted on the light guide which is again mounted in the frame by mounting members that can snap into position on the carrier.

The LCD can further be provided with a strip of dual adhesive tape around the front side, so that the LCD is adhesively joined to the inside of the frame. However, with this method of LCD positioning it is difficult to ensure the required accuracy in the LCD position.

The tolerance chain in this assembly is extensive and may sometimes cause the window printing or the front cover to seal the active area of the LCD. This extensive tolerance chain can also result in a loss of contact with the elastomeric connector between the LCD and the PCB.

Beside the extensive tolerance chain in this LCD assembly, this known assembly consists of many parts which make the assembly complicated and relatively labour intensive in order to achieve the required accuracy in the final result.

On this background, it is an object of the invention to provide for a more precise mounting of a first apparatus part having irregular edges on a second apparatus part, thereby improving quality and reducing waste. It is another object of the invention to obtain an assembly that is less labour intensive and easier (and thus potentially of lower cost) to manufacture.

These objects are achieved by the invention as disclosed in claim 1 by laying out at least one distinctive mark by means of the position reference system on said first apparatus part in a well-defined geometrical relationship to said one or more components, by securing second positioning means on the first apparatus part in a well-defined geometrical relationship to the distinctive mark(s) by means of a positioning system, and by mounting the first apparatus part on the second apparatus part by means of said first and second positioning means.

According to the invention, one or more distinctive marks added to the substrate of a first apparatus part by a so-called position reference system used in the production process of the part are used for the positioning and fixing of the part (according to one or more 'decisive components' included on the part) with respect to a second apparatus part, said second apparatus part being provided with first positioning means. The relevant distinctive mark(s) is(are) read from the first apparatus part by a positioning system and the information is used to position the part relative to other structures with which it is to be assembled. Second positioning means, designed to co-operate with the first positioning means on the second apparatus part, are secured on the first apparatus part in accordance with the distinctive mark(s) and thus in a well-known geometrical relationship to the 'decisive components' on the part. The two sets of co-operating positioning means may hence be designed and positioned on the first and second apparatus parts, respectively, so that when the co-operating positioning means are joined, a controlled geometrical relationship is obtained between the 'decisive components' on the first apparatus part and relevant corresponding features on the second apparatus part. The 'decisive component' on the first apparatus part may e.g. be the active area of an LCD, and the corresponding feature on the second apparatus part may e.g. be the display window of a light carrier of a mobile telephone.

The invention utilises distinctive marks added to an apparatus part during its processing, these distinctive marks having 'microscopic' tolerances as they are e.g. the results of a semiconductor-like process, to control the positioning of decisive components or other structural elements on the apparatus part relative to corresponding features on another part. Thereby the 'macroscopic' positioning of the apparatus part on the body in question is based on the 'microscopic' tolerances of the production process of the apparatus part.

An advantage of the method is that the apparatus part provided with distinctive marks to be used in the positioning and mounting of the part on another apparatus part may be produced in one production process (e.g. a semiconductor process or the like) and used as a 'component' in a device assembled with another apparatus part in another production process, possibly at different locations. A further advantage of the method is that it is well-suited for automation and hence of course advantageous from a precision and cost perspective, when dealing with large quantities. Since the guiding means ensure a correct position of the first part relatively to the second part, the actual joining of the parts is uncritical, and therefore the parts may alternatively be joined using a manual or semi-automatic assembly without loss of precision. This may be advantageous e.g. in prototype developments or when dealing with small quantities or if manual assembly is attractive for other reasons.

By, as disclosed in claim 2, further, i.e. in addition to the ones laid out by the position reference system, securing one or more additional components or structural elements on the first apparatus part under control of the positioning system using the distinctive marks, a greater flexibility is achieved in allowing the mass production of identical parts in one location and the possible customisation and use of the part in other locations. This is exactly the relevant scenario in many applications of electronic (and other) components for the construction of semi-finished or finished devices.

In a special embodiment of the invention, as stated in claim 3, the apparatus part is a liquid crystal display module including a liquid crystal display with corresponding electronic circuit(s) and electrical connections. Special advantages of the mounting of the display according to the invention are 1) better use of the active display area and 2) better control of the electrical connections between the display unit and other parts, e.g. a PCB.

The cornerstone of the invention is the use of the 'distinctive marks' laid out by a high-precision positioning system. In preferred embodiments of the invention these distinctive marks may be special alignment marks, electrical connections, as stated in claim 4, or pads for electrical connections, the advantages of each being dependent on the particular process, type of apparatus part, positioning system used for the assembly, required precision, etc. Important is 1) that the distinctive marks used are laid out with high precision, 2) that an exact relationship to the location of the decisive parts of the components to be used in the positioning of the part relative to other structures is or may be established and 3) that the distinctive marks are easy to identify for the positioning system used in the assembly process.

The 'positioning system' may be the position reference system or another positioning system having means for reading the relevant distinctive marks. In a special embodiment of the invention, as stated in claim 5, the positioning system may e.g. be a vision system used in the assembly process, the first apparatus part being joined with other apparatus parts. A 'vision system' is a pattern recognition system that enables automatic handling of known structures, e.g. by an assembly robot. The vision system must be able to read the relevant distinctive marks on the apparatus part. This has the economic and logistic advantage that the use of the invention may be integrated in a 'normal' assembly chain. The 'position reference system' is the positioning system used for the layout of the distinctive marks and of the individual layers or steps that constitute the creation of or placement of the components and structural elements in the production process of the first apparatus part. In another special embodiment of the invention, as stated in claim 6, the positioning system is equal to the position reference system. This has the advantage that the positioning means of the first apparatus part can be applied in the same operation and with the same accuracy as the components or other structural elements in question and as the distinctive marks of the part, thus eliminating a link in the tolerance chain.

In special embodiments of the invention, the first positioning means on the second apparatus part with which the first apparatus part is to be joined via its co-operating positioning means are designed with a view to receiving said co-operating positioning or guiding means to obtain a precise and cost-effective mounting of the apparatus part at the same time. The positioning means on the apparatus part may be fixed to the part by gluing, soldering, fastening by screws or the like, depending on the materials, the mechanical constraints, etc. involved. In a preferred embodiment of the invention, as stated in claim 7, the guiding means of the first apparatus part comprise at least two protruding members which are inserted in the receiving means of the second apparatus part comprising a corresponding number of receiving openings. Hereby, a simple and particularly inexpensive way of precision mounting the apparatus parts is obtained. Alternatively, as stated in claim 8, the guiding means of the first apparatus part may comprise at least two apertures which co-operate with the receiving means of the second apparatus part comprising a corresponding number of protruding members. Other joining techniques (e.g. snap fasteners, fastening by screws, glue, adhesive tape, etc.) or combinations thereof may be used, if conditions so permit.

In a preferred embodiment of the invention, the method may be used for the positioning of a first apparatus part (e.g. a display) relative to a second apparatus part, e.g. a light guide, as stated in claim 9, for distributing light to push buttons or the like in an electronic device, e.g. a mobile phone. This has the advantage of enabling low-cost mass production of a vital apparatus part of use in a range of high-volume communications devices and at the same time solving an existing problem.

In another preferred embodiment of the invention, as stated in claim 10, the method may be used for the positioning of a first apparatus part relative to a printed circuit board. This has the economic and technical advantage of reducing the requirements with respect to the tolerances of the layout of the connections on the PCB as well as any connecting members involved.

In other preferred embodiments of the invention, as stated in claim 11, the method may be used for the positioning of a first apparatus part relative to a part of the housing of the apparatus and in particular, as stated in claim 12, to the front cover of the apparatus. This offers additional design options for the designer of the electronic hardware inside the apparatus and a particular simple way of mounting the apparatus part in relation to the housing.

As stated in claim 13, the present invention further provides an apparatus including at least a first apparatus part and a second apparatus part which are mutually precision-mounted by means of first positioning means on the second apparatus part and second positioning means on the first apparatus part so that components on the first apparatus part are positioned with a well-defined geometrical relationship relatively to structural features on a second apparatus part.

By providing the first apparatus part with at least one distinctive mark which has a well-defined geometrical relationship to components on the first apparatus part, and while the second positioning means are positioned with a well-defined geometrical relationship relatively to said distinctive mark(s) and to said components, and the second apparatus part has its first positioning means positioned in a well-defined geometrical relationship relatively to said structural features, it is ensured that the critical parts are precision-mounted in the apparatus, thereby enhancing quality, promoting automation in assembly and potentially reducing costs.

In a special embodiment of the invention, as stated in claim 14, the apparatus is a mobile telephone, the production of which is subject to the constraints of producing large quantities of high-performance devices at a low cost, thereby making the use of the present invention advantageous.

As disclosed in claim 15, the present invention further provides an apparatus part including one or more components positioned on the apparatus part by means of a position reference system. Since the part additionally includes at least one distinctive mark laid out in a well-defined geometrical relationship to said one or more components by means of said position reference system, and while positioning means are secured on the apparatus part in a well-defined geometrical relationship to the distinctive mark(s) by means of a positioning system (e.g. a vision system), it is ensured that such apparatus parts may be precision-mounted on other apparatus parts and in an apparatus, thus enhancing quality, promoting automation in assembly and potentially reducing costs.

In a preferred embodiment of the invention, as stated in claim 16, one or more other components or other structural elements are secured to or laid out on the apparatus part under control of the positioning system. This has the advantage of allowing the mass production of identical parts in one location and the possible customisation and use of the part in other locations which provides a greater flexibility in the completion of the finished device.

In other preferred embodiments of the invention, the distinctive marks may be special alignment marks, electrical connections, as stated in claim 17, including pads, the advantages of each being dependent on the particular process, type of apparatus part, positioning system used for the assembly, required precision, etc.

In a preferred embodiment of the invention, as stated in claim 18, the positioning means of the apparatus part include means for establishing electrical contact to another another apparatus part (e.g. a printed circuit board) in the form of a receiving slot for accommodating an elastomeric block with a plurality of individually isolated conducting members. This has the advantage of facilitating the establishing of reliable electrical contacts between the apparatus part and a printed circuit board. The improved accuracy in the connections of the apparatus part to the PCB may be achieved in addition to the precision mounting of the apparatus part relative to another part by designing corresponding positioning means on the PCB.

In special embodiments of the invention, as stated in claim 19, one of said one or more components on the apparatus part is a liquid crystal display and, as stated in claim 20, one of said one or more additional components is a driver circuit for the display.

In a preferred embodiment of the invention, the apparatus part is a liquid crystal display module, the driver circuit is secured to the apparatus part under control of the positioning system, and the distinctive marks are electrical connections (e.g. pads). This is an embodiment that may be used in a variety of electronic devices, including mobile telephones, pagers, electronic calculators, etc.

The invention will now be described more fully below with reference to the drawing, in which.

Figure 1:
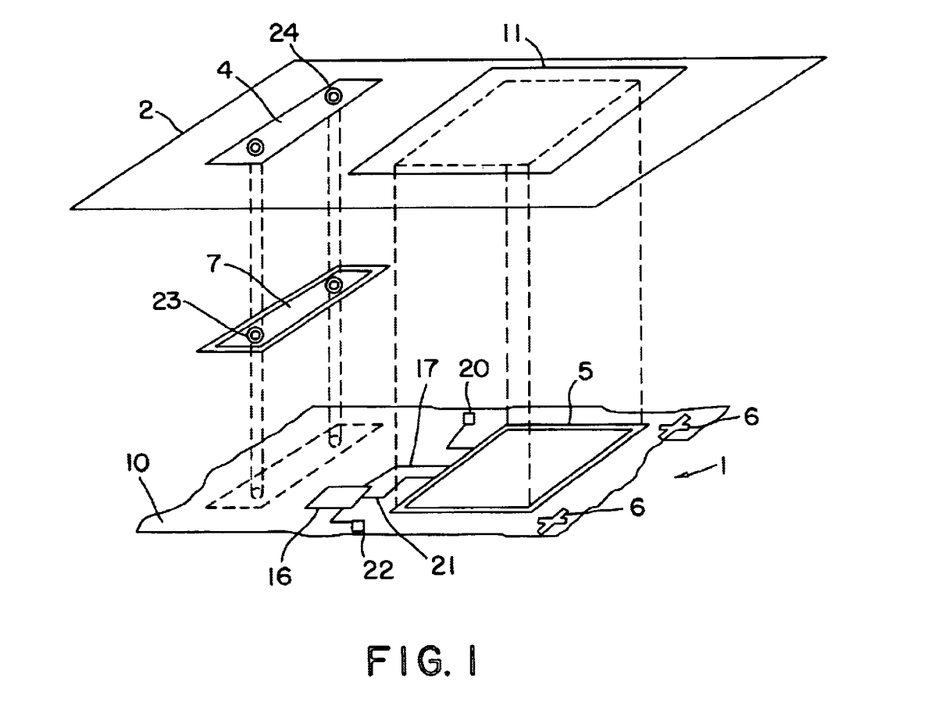
FIG. 1 shows a first apparatus part with distinctive marks, its guiding positioning means and a second apparatus part with its corresponding receiving positioning means according to the invention.

FIG. 1 shows a first apparatus part 1 consisting of a substrate 10 on which a component 5 and an electrical connection 17, a pad 20 and distinctive marks 6 are laid out by a position reference system during the production of the apparatus part. The component 16, the electrical connection 21 and the pad 22 are secured to the apparatus part 1 by a positioning system during a further processing of the apparatus part. The positioning means 7 of the first apparatus part are shown with two stylised guiding means 23, designed to match the corresponding stylised guiding means 24 on the positioning means 4 of the second apparatus part 2 and to ensure the correct position of the apparatus part 1 relative to the second apparatus part 2 and the component 5 relative to the feature 11 in particular.

FIG. 1 illustrates the basic idea of the invention, namely to utilise distinctive marks 6 added to an apparatus part 1 during its processing (by a reference positioning system) to position it precisely relative to another part or structure 2, e.g. in an apparatus.

The distinctive marks 6 should have well defined geometrical relations to the 'decisive components' 5 or structural elements 17, 20 of the first apparatus part 1 (i.e. e.g. to its edges, to the boundaries of certain components of the part, to its electrical connections, etc.) which are to govern the position of the part 1 (and the component 5 in particular) relative to specific features 11 of the second apparatus part 2, to which it is to be joined. This information must be extracted from the reference positioning system and transferred to and used by the positioning system controlling the assembly process. The chosen distinctive mark(s) 6 of the first apparatus part may e.g. be used by a positioning system as fix-points, and the positioning means 7 of the first apparatus part 1 may be located on the part with a known geometrical relationship to the fix-points and hence to the decisive components 5 or structural elements 17, 20 on the first apparatus part 1. With knowledge of this geometrical information, the co-operating positioning means 4 on the second apparatus part 2, with which the first apparatus part 1 is to be joined, may be designed and located on the second apparatus part to implement a desired position of the decisive components 5 or structural elements 17, 20, on the first apparatus part 1 relative to corresponding features 11 of the second apparatus part 2, when the co-operating positioning means 4, 7 are joined.

The 'distinctive marks' 6 may be special alignment marks, electrical connections 17 or pads 20 for electrical connections, structural features of active or passive devices (e.g. gates of transistors, boundaries of capacitors) or other structures that are easy to identify for the positioning system used in the assembly process (including e.g. micromechanical features). A single distinctive mark 6 (e.g. a cross or a circle) may fix a first apparatus part 1 relative to a second apparatus part 2 in one dimension (e.g. sufficient if the part or the structure shows rotational symmetry). Two separate distinctive marks 6 are required to fix the first apparatus part 1 to a second apparatus part 2 in two dimensions.

In this context the term 'the first apparatus part' 1 may cover a device consisting of a substrate 10 on which one or more components 5, 16 or other structural elements 17, are integrated, possibly with connections 20 to the exterior and between them 17. An 'apparatus part' 1 may e.g. be a liquid crystal display module, a multi-chip-module (MCM), a micro-mechanical module, an integrated optics module, etc.

The 'second apparatus part' 2 in relation to which the first apparatus part 1 is to be positioned (and joined) may be a special carrier (e.g. a light guide), a PCB, a housing member (including an outer housing member, e.g. a front cover, a frame, etc.), an identical apparatus part (enabling the cascading of identical parts), a guiding means for co-operating with corresponding receiving means on another device, etc.

In this context the 'substrate' 10 of the apparatus part 1 is taken to mean any carrier, e.g. a semiconductor substrate, a PCB, a glass or ceramic plate or the like.

'Components' 5, 16 may e.g. be the active parts of a display (e.g. of an LCD), integrated circuits (e.g. a driver circuit for a display), micro-mechanical devices, electro-optical devices, optical devices (e.g. laser diodes or photodiodes) or other functional bodies. For the positioning of components 5, 16 or other structural elements 17, 20, 21, 22 on the apparatus part, the position reference system or another positioning system may be used, possibly one or more components 5 or other structural elements 17, 20 by the position reference system and one or more other components 16 or other structural elements 21, 22 by another positioning system. The term 'decisive components' refer to the components or component features that are to control the positioning of the first apparatus part relative to the second apparatus part.

'Structural elements' are taken to mean parts of a component that may be isolated due to their function or visual appearance or other functional features (e.g. electrical connections 17, 21 or other connections, including pads 20; 22). The structural elements 17, 20 may be added to the part 1 by means of the position reference system or another positioning system (in the latter case they are referred to as 21, 22).

The 'position reference system' is the positioning system or systems (in case that more than one is used) used for the layout of the distinctive marks 6 and of the individual layers or steps that constitute the creation of or placement of the decisive components 5 and structural elements 17, 20 in the production process of the apparatus part 1.

The 'positioning system' may be the position reference system or another positioning system having means for reading the relevant distinctive marks 6. The positioning system may be used to secure one or more components 16 or other structural elements 21, 22 to the apparatus part 1 (in addition to the ones laid out by the position reference system (possibly 5, 17, 20)). The positioning system may e.g. be a vision system used in the assembly process, where the first apparatus part 1 is joined with other apparatus parts 2. A 'vision system' is a pattern recognition system that enables automatic handling of known structures, e.g. by an assembly robot. The vision system must be able to read the relevant distinctive marks 6 on the apparatus part 1 and to use information from the position reference system as to the mutual relative positions of the distinctive marks 6 and the 'decisive components' 5 on the apparatus part 1. If the positioning system is the position reference system, the positioning means 7 of the apparatus part 1 can be applied in the same operation and with the same accuracy as the components 5 or other structural elements in question and as the distinctive marks 6 of the part 1. This has the advantage of eliminating a link in the tolerance chain.

Figure 2:
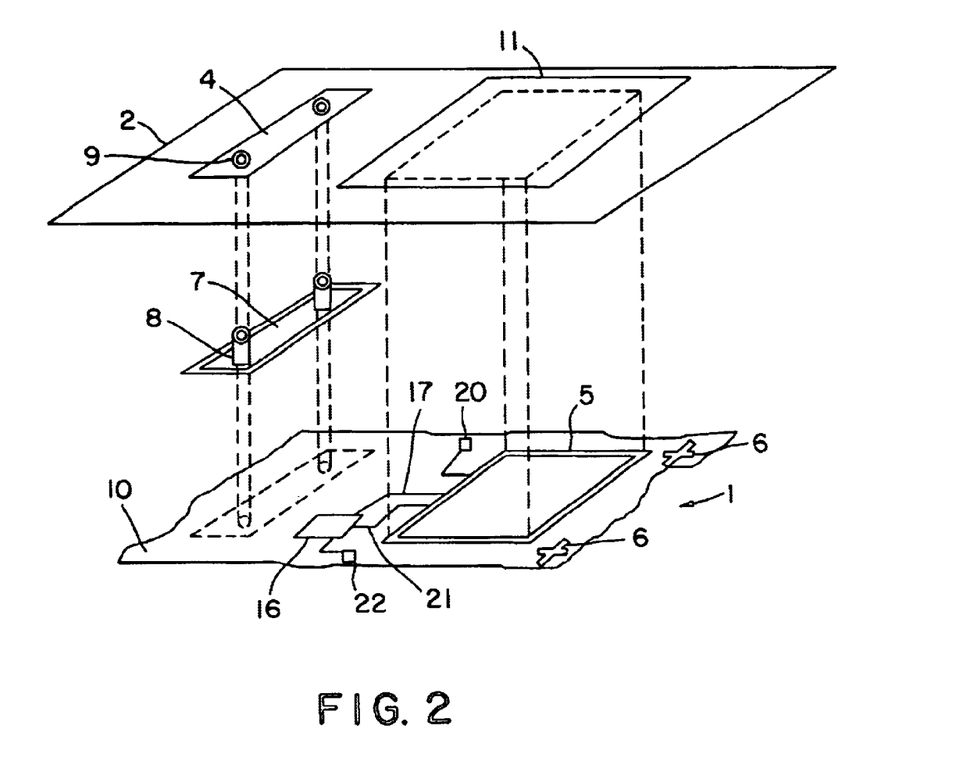
FIG. 2 shows a first apparatus part with distinctive marks, its guiding positioning means (including two protruding members) and a second apparatus part with its corresponding receiving positioning means (with corresponding apertures) according to the invention.

FIG. 2 is identical to FIG. 1, except that the positioning means 7 of the first apparatus part 1 are shown with two protruding members 8. These members 8 are designed to match the corresponding apertures 9 on the receiving positioning means 4 of the second apparatus part 2 and to ensure the correct position of the first apparatus part 1 relative to the second apparatus part 2.

Figure 3:
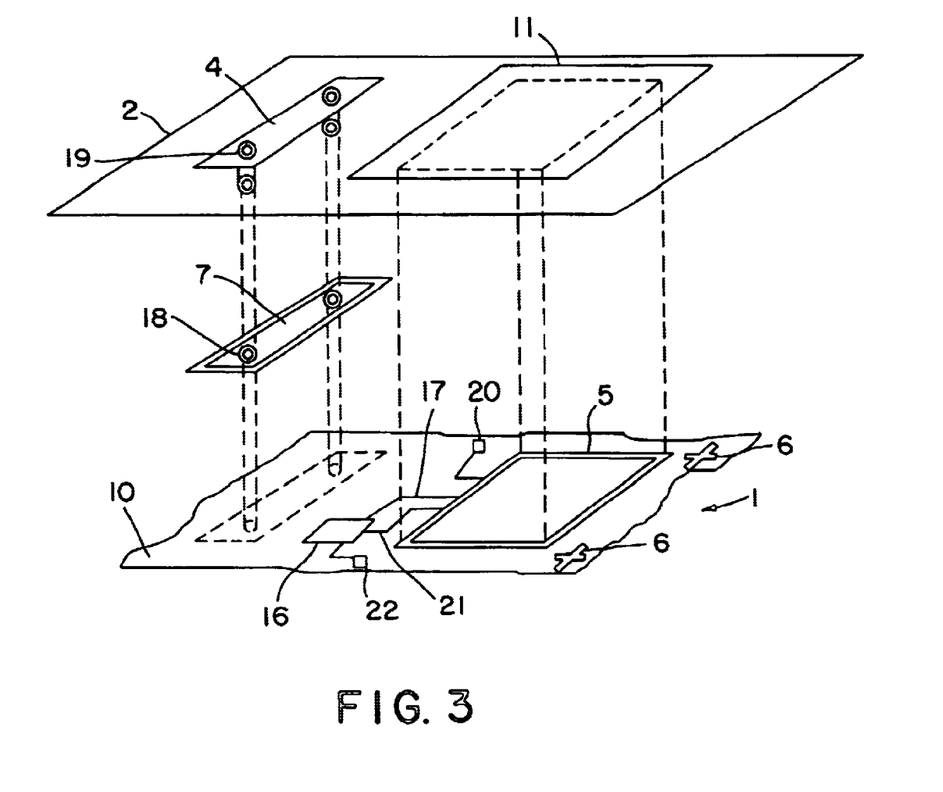
FIG. 3 shows a first apparatus part with distinctive marks, its guiding positioning means (including two apertures) and a second apparatus part with its corresponding receiving positioning means (with corresponding protruding members) according to the invention.

FIG. 3 is identical to FIG. 1, except that the positioning means 7 of the first apparatus part 1 are shown with two apertures 18 that co-operate with the receiving means 4 of the second apparatus part 2 comprising a corresponding number of protruding members 19. These members 18 are designed to match the corresponding apertures 19 on the receiving positioning means 4 of the second apparatus part 2, and to ensure the correct position of the first apparatus part 1 relative to the second apparatus part 2.

Figure 4:
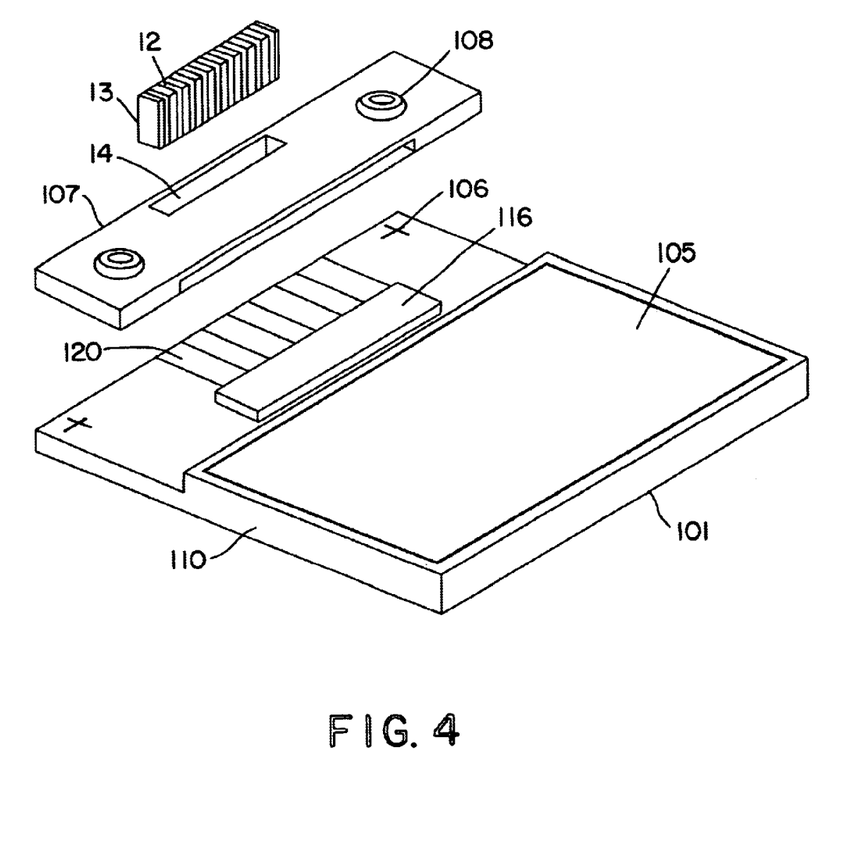
FIG. 4 shows an exploded view of an apparatus part (a substrate with an LCD) with distinctive marks and its corresponding positioning means according to the invention.
Figure 5:
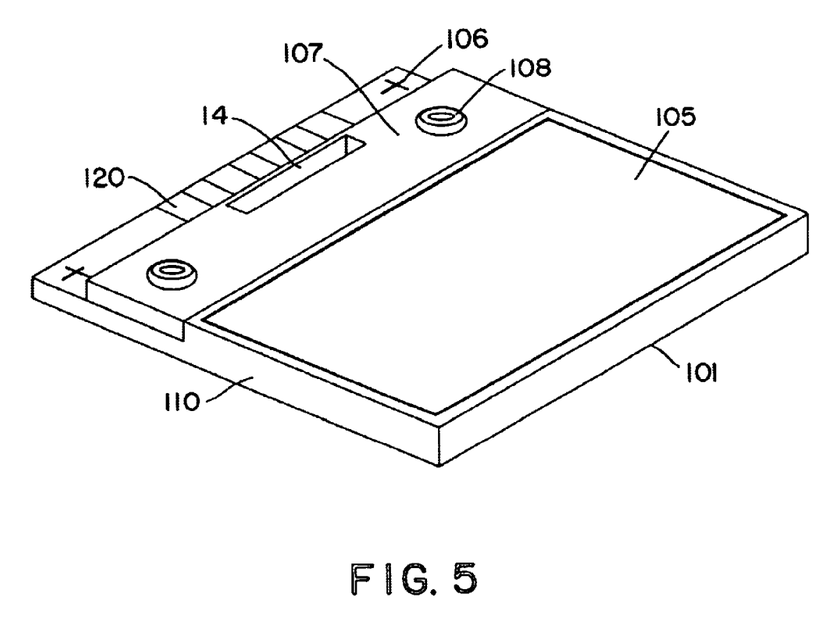
FIG. 5 shows the positioning means fixed on the apparatus part (an LCD unit) according to the invention.

FIGS. 4 and 5 show a preferred embodiment of the invention where the first apparatus part 1 is an LCD unit 101 (i.e. the 'decisive component' (5 in FIGS. 1–3) is the active display area 105 of the LCD) comprising a glass plate substrate 110 that is provided with a transparent print of an electrically conductive pattern controlling the visual output of the display. Also included on the first apparatus part is a driver circuit 116 for the LCD, the driver circuit being secured to the apparatus part 101 under control of a vision system using distinctive marks. The electrical connections (e.g. pads 120) may be used as distinctive marks. The positioning means 107 of the first apparatus part 101 are shown with two protruding members 108. These members 108 are designed to match the corresponding apertures (109 in FIG. 6) on the receiving positioning means of the second apparatus part 102 (in FIG. 6) and to ensure the correct position of the first apparatus part 101 relative to the second apparatus part 102 (in FIG. 6). The positioning means 107 of the first apparatus part 101 include a receiving slot 14 for accommodating an elastomeric block 13 with a plurality of individually isolated conducting members 12 for establishing electrical contact between the first apparatus part 101 and a printed circuit board (115 in FIG. 7). In FIG. 4 and 5, the positioning means 107, including means for establishing electrical contact to a PCB (115 in FIG. 7), are mounted on the same side of the substrate 110 as the active display area 105. They might, however, also be mounted on the opposite side of the substrate 110 (as indicated in FIG. 7).

The distinctive marks 106 (or 120) on the LCD unit 101 have well-defined geometrical relations to the active area of the display 105 (i.e. to its boundaries), which is to control the position of the unit relative to the light guide (102 in FIG. 6 and 7) (and in particular relative to its window (cf. 111 in FIG. 6)), to which it is to be joined. This information must be extracted from the reference positioning system used during the layout of the LCD unit 101 and transferred to and used by the vision system controlling the assembly process. The chosen distinctive marks 106; 120 of the LCD unit 101 are used by the assembly system as fix-points, and the positioning means 107 of the LCD unit 101 may be located on and secured to the LCD-substrate 110 with a known geometrical relationship to the active area of the display 105. With knowledge of this geometrical information, the co-operating positioning means (109 in FIG. 6) on the light guide (102 in FIG. 6) may be designed and located on the light guide to implement a desired position of the active area 105 of the display unit 101 relative to the corresponding window (111 in FIG. 6) of the light guide (102 in FIG. 6), when the co-operating positioning means (108, 109) are joined.

In one embodiment of the invention, the positioning means 107 of the LCD unit 101 are secured to the unit 101 using glue. Other embodiments may be made, using adhesive tape, soldering or fastening by screws or the like.

Figure 6:
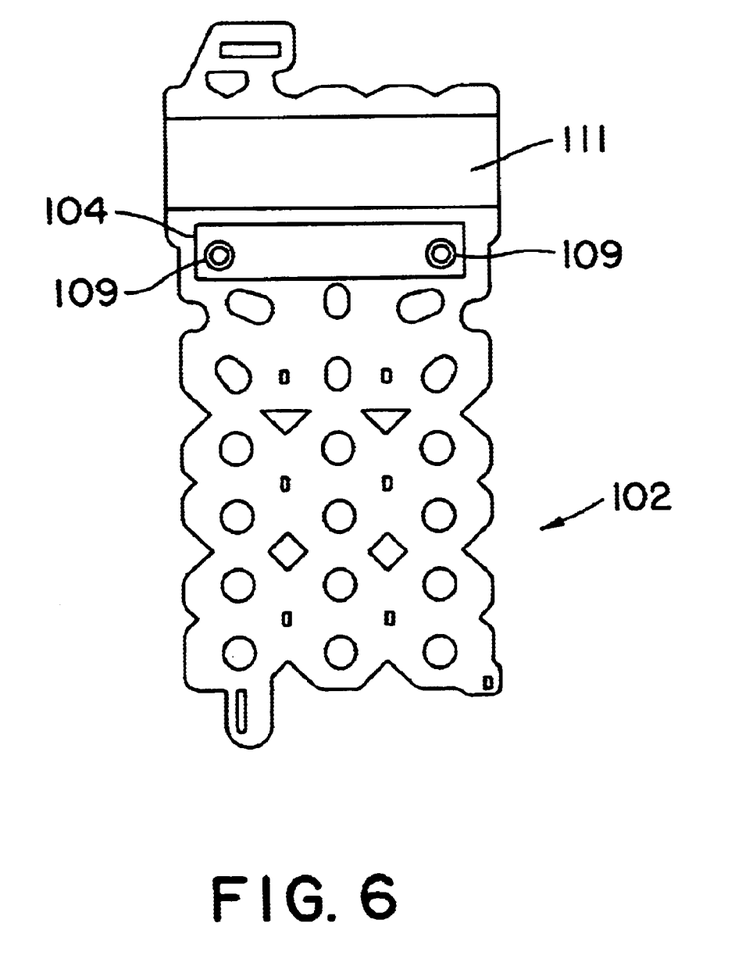
FIG. 6 shows a front view of a carrier body (a light guide for a mobile telephone) for an LCD unit with a window corresponding thereto and receiving positioning means according to the invention.
Figure 7:
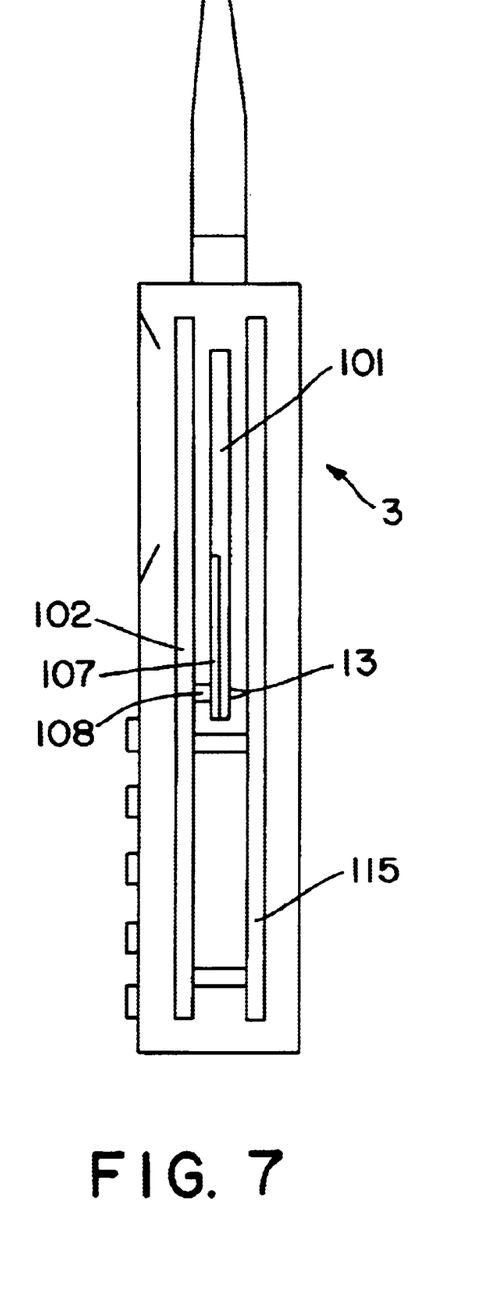
FIG. 7 shows a schematic side view of a communications device (a mobile telephone) according to the invention with an LCD unit mounted on a light guide and with electrical connections to a PCB.

In FIG. 6, a light guide 102 for a mobile telephone (3 in FIG. 7) is shown. This plate-shaped light guide 102 functions as a carrier for the LCD display unit 101. The light guide 102 is preferably made in a transparent plastics material and comprises a window area 111 and receiving guiding means 104 provided with two apertures 109 adjacent to the window area 111 for receiving and accurately positioning the guiding means (107, 108 in FIGS. 4, 5) of the LCD display unit 101.

The two apertures 109 in the light guide, 102 are dimensioned and positioned such as to accommodate the correspondingly positioned and dimensioned protrusions 108 on the positioning means 107 of the display unit (101 in FIGS. 4 and 5). This ensures that the active area 105 of the display unit 101 is accurately positioned with respect to the corresponding window 111 of the light guide 102.

In one embodiment of the invention, the LCD unit 101 is secured to the light guide 102 simply by joining the protruding members (108 in FIG. 4, 5) of the positioning means 107 on the LCD unit 101 with the corresponding apertures 109 on the receiving positioning means 104 of the light guide 102. Other embodiments may be made, using other joining techniques (e.g. snap fasteners, fastening by screws, glue, adhesive tape, 'click-join', etc.) or combinations hereof.

In FIG. 7, the mounting of an LCD display unit 101 in a mobile telephone 3 is shown. The LCD display unit 101 is positioned on a light guide 102 that is assembled to a printed circuit board (PCB) 115. This assembly is mounted in the front cover of the mobile phone 3. The LCD unit 101 is provided with positioning means 107 comprising protruding means 108, which are used for precision mounting the unit 101 to the light guide 102 by joining them with correspondingly positioned and dimensioned apertures (cf. 109 in FIG. 6) in the light guide 102. Electrical connection between the LCD unit and the PCB 115 is achieved by an elastomeric block 13 with a plurality of individually isolated conducting members (12 in FIG. 4).

The 'apparatus' 3 in which the apparatus parts 1, 2; 101, 102 are mounted may be any apparatus in which the unique features of the method are required, including electronic devices, e.g. communications devices, among these mobile telephones, pagers, etc.

In the embodiments described above, the invention has been used in connection with the precision mounting of an LCD unit in a mobile telephone. The invention may, however, be used in all other cases where a precisely laid out first apparatus part is to be precision mounted on another apparatus part by using, in the assembly process, distinctive marks originating from the layout of the first apparatus part.

What is claimed is:

1. A method for the precision mounting of a first apparatus part of a mobile communication device on a second apparatus part of a mobile communication device, the first apparatus part having irregular edges, and the second apparatus part being provided with first positioning means, and the first apparatus part including one or more components positioned by means of a position reference system, the method comprising the steps of:

laying out at least one distinctive mark by means of the position reference system on said first apparatus part in a well-defined geometrical relationship to said one or more components;

securing second positioning means on the first apparatus part in a well-defined geometrical relationship to the distinctive mark(s) by means of a positioning system; and mounting the first apparatus part on the second apparatus part by means of said first and second positioning means.

2. A method according to claim 1, further comprising the step of securing one or more additional components or structural elements on the first apparatus part under control of the positioning system.

3. A method according to claim 1 wherein the first apparatus part is a liquid crystal display module including a liquid crystal display with corresponding electronic circuit(s) and electrical connections.

4. A method according to claim 1, wherein the distinctive marks are electrical connections.

5. A method according to claim 1, wherein the positioning system is a vision system.

6. A method according to claim 1, wherein the positioning system is the position reference system.

7. A method according to claim 1, wherein the first positioning means is provided with receiving openings and the second positioning means of the first apparatus part is provided with at least two protruding members, the method further comprising the step of inserting the protruding members in the receiving openings of the first positioning means.

8. A method according to claim 1, wherein the first positioning means is provided with protruding members and the second positioning means of the first apparatus part is provided with at least two apertures which co-operate with the protruding members.

9. A method according to claim 1, wherein the second apparatus part is a light guide.

10. A method according to claim 1, wherein the second apparatus part is a printed circuit board.

11. A method according to claim 1, wherein the second apparatus part is a part of a housing of the apparatus.

12. A method according to claim 11, wherein the second apparatus part is a front cover of the apparatus.

13. An apparatus part of a mobile communication device comprising:

one or more components positioned by means of a position reference system;

at least one distinctive mark laid out in a well-defined geometrical relationship to the one or more components by means of the position reference system; and positioning means secured on the apparatus part in a well-defined geometrical relationship to the at least one distinctive mark by means of a positioning system.

14. An apparatus part according to claim 13, wherein at least one additional component or other structural is secured to the apparatus part under control of the positioning system.

15. An apparatus part according to claim 13, wherein the distinctive marks are electrical connections.

16. An apparatus part according to claim 13, wherein the positioning means secured on the apparatus part include means for establishing electrical contact with another apparatus part.

17. The apparatus part of claim 16, wherein the means for establishing electrical contact with another apparatus part comprises a receiving slot for accommodating an elastomeric block with a plurality of individually isolated conducting members.

18. An apparatus part according to claim 13, wherein the one or more components comprises a liquid crystal display.

19. An apparatus part according to claim 18, wherein the one or more components comprises a driver circuit for the liquid crystal display.

* * * * *